3,567,646
STABLE CESIUM COMPOUNDS
John H. Gray III, Baltimore, Md., assignor to the United States of America as represented by the United States Atomic Energy Commission
No Drawing. Filed Apr. 22, 1964, Ser. No. 362,556
Int. Cl. C09k *3/00;* C01g *41/00*
U.S. Cl. 252—301.1          8 Claims This invention relates to the synthesis of stable cesium compounds and more particularly to the synthesis of stable cesium compounds for fuel for radioisotope heated thermoelectric generators.

In radioisotope heated thermoelectric generators, it has become desirable to provide cesium-137 as a heat source or fuel. This material is a readily available waste product from nuclear reactors, has a long half-life of 30 years and has sufficiently energetic beta and gamma radiations to render it suitable for use in systems for nuclear auxiliary power and in satellites. However, the cesium compounds available heretofore have not had the required hardness, high temperature resistance, high cesium-137 density, or they have been readily soluble in dilute acids or bases or in hot or cold water. Additionally it has been advantageous to provide an economical process for synthesizing the cesium compounds with low cesium losses.

An object of this invention, therefore, is to provide a cesium compound for fuel for radioisotope heated thermoelectric generators;

It is also an object of this invention to provide a hard high temperature, high cesium 137 density compound with low solubility in weak acids, weak bases, cold water and hot water;

It is also an object of this invention to provide an economical low cesium loss method of making cesium fuel for thermoelectric generators;

It is also an object of this invention to provide a method for effectively utilizing the cesium waste products from controlled fission reactions;

It is a further object of this invention to produce $Cs_2WO_4$ from the products of controlled fission reactions;

It is another object of this invention to synthesize $Cs_2WO_4$ from $Cs^{137}Cl$ and to form cesium tungsten tantalate therefrom;

It is still another object of this invention to fuse $Cs_2WO_4$ and boric acid with metal oxide compounds to form a stable cesium compound with low cesium loss.

In accordance with this invention $Cs_2WO_4$ fuses with a metal oxide without substantially losing cesium and forms a hard, high melting cesium compound which is insoluble. The method involved in this invention utilizes standard and well known techniques and apparatus and is highly effective for a wide range of thermoelectric generator fuel applications. More specifically, this invention involves the conversion of highly active fuel solutions of $Cs^{137}Cl$ to $Cs_2CO_3$ and to $Cs_2WO_4$, and the fusing of this product with $B_2O_3$ and a metal oxide selected from the group consisting of $Nb_2O_5$ and $Ta_2O_5$ to form a hard, high temperature insoluble cesium compound. With the proper selection of conditions, as hereinafter described in more detail the desired cesium compound and high cesium-137 density fuel is made easily and economically substantially without the loss of cesium.

The cesium-137 is advantageously obtained as a waste product produced during the controlled fission reactions involving uranium and plutonium in nuclear reactors. This cesium-137 is readily available in the form of $Cs^{137}Cl$ from the reactor fuel storage facilities at the reactor site by absorbing the $Cs^{137}$ from the fuel on a suitable inorganic ion exchange material such as a precipitated gel type sodium alumino silicate cation exchanger. One suitable exchanger is the Decalso brand ion exchange gel for water softening made by the Permutit Company of New York, N.Y. Subsequently, this ion exchange matrix is leached with small quantities of dilute hydrochloric acid to produce the feed solution containing the $Cs^{137}Cl$.

For further processing, either cesium carbonate or cesium hydroxide is used as the starting material and ion exchange is used to prepare either cesium carbonate or a hydroxide solution. In this ion exchange conversion the cesium chloride solution is converted to a $Cs_2CO_3$ or CsOH solution by an anion exchange column, having an anion exchange resin therein. One advantageous resin for this purpose is the Dowex 1 brand of ion exchange resin made by the Dow Chemical Co., Midland, Mich. This resin is converted to the carbonate or hydroxyl-form by pre-treatment with concentrated $(NH_4)_2CO_3$ or $NH_4OH$. In both cases the column is washed free of ammonia with repeated column-volumes of water. Also, the effluent solutions of $Cs_2CO_3$ and CsOH are concentrated by evaporation after which the normalty of each is determined.

In another alternate technique for further processing the cesium chloride, the latter is converted to cesium sulfate and this sulfate is interacted with barium hydroxide to form cesium hydroxide. Here, concentrated sulfuric acid is added to the cesium chloride solution and this is evaporated until dense white fumes of $SO_3$ are evolved. After careful dilution with water, this solution is added to a concentrated $Ca(OH)_2$ solution until the clear supernatant no longer forms a $BaSO_4$ precipitate. The precipitate is then separated by centrifugation after which the normality of the cesium hydroxide solution is determined.

The synthesis of $Cs_2WO_4$, M.P. >800° C., substantially without cesium loss, is made by the following reactions:

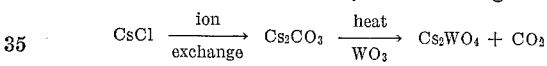

To this end stoichiometric mixtures of the reactants, containing Cs-137 are fired up to 600° C. or kept at 370° C. for 3–16 hours with no loss of reactivity. As shown by X-ray diffraction analysis, the product is cesium polytungstate. A small amount of unreacted $Cs_2CO_3$ in the product is converted by excess $WO_3$. The soluble $Cs_2WO_4$ is separated and purified from the unconverted $WO_3$ by water extractions. An excess of $WO_3$ may be used during the production of the $Cs_2WO_4$.

It will be understood that the above-described synthesis of cesium tungstate requires the incorporation of a $Cs_2O$ molecule within the final structure of the material and high-temperature fusion of the reactants at temperatures greater than 1000° C. has been required to supply enough energy to break and reform the molecular bonds. Thus although fusion with $Cs_2CO_3$ has resulted in the formation of the desired products, varying amounts of cesium can be volatilized and thereby lost. For example, decomposition of $Cs_2CO_3$, with liberation of $CO_2$, begins below its melting point of 610° C. and yields unstable $Cs_2O$ so that unless a reaction site is instantly available, the unstable $Cs_2O$ molecule may be lost.

It has been found that the amount of the loss of the cesium during the fusion of mixtures containing $Cs_2CO_3$ (also CsOH) is greatly reduced whenever the ignition temperature is maintained below 1450° C. This is explained by the lessened volatility of the $Cs_2O$ molecules below this temperature.

The above-described compounds, like cesium compounds in general, are highly soluble in solvents having high dielectric constants and unfortunately this feature renders them unsuitable from a safety standpoint for thermoelectric generator fuels requiring low solubility in weak acids and bases and cold water or hot water. Additionally, they lack other advantageous physical and chemical properties for fuel for radioisotope heated thermoelectric generators, comprising a melting point above 800° C. or a high hardness or fabricability for good green pellet strength, good sintered pellet hardness and high sintered pellet density.

By fusing $Nb_2O_5$ and $Ta_2O_5$ respectively with $Cs_2WO_4$ for from 1–10 hours or until a constant weight is obtained, e.g. at 1000° C. and then at 1450° C. for 4 hours in a platinum crucible, the new materials $CsW_xNb_{1-x}O_3$ and $CsW_xTa_{1-x}O_3$ are synthesized. The former is a pale yellow crystalline product yielding an X-ray diffraction pattern that is dissimilar with the pattern of the product prepared by the fusion of cesium carbonate and nobium pentoxide, since some tungsten atoms are in the niobate crystals. Material balance calculations support this hypothesis, since the density of the crystalline material is 2.4 percent greater than that calculated for pure $CsNbO_3$. The reaction is:

$$Cs_2WO_4 + Nb_2O_5 \rightarrow 2CsNb_{1-x}W_xO_3 + (1-x)WO_3 + xNbO_3$$

The proportion of tungsten incorporated into the basic niobate structure varied by changing the reaction conditions. In all cases, however, the loss of cesium during the production of this product is substantially small or unmeasurable.

Similarly, the loss of cesium is small during the production of $CsW_xTa_{1-x}O_3$ from the fusion of $Cs_2WO_4$ with reagent grade $Ta_2O_5$. These reactants are likewise mixed with small amounts of water, fired until a constant weight is obtained, but a temperature of only 1400° C. for two hours is required to complete the reaction to $$CsTa_{1-x}W_xO_3$$

The X-ray patterns confirmed these products and showed tungsten in the lattice structure. Moreover, little decomposition of the tantalate compound was encountered and, as with the niobate, this was the case because of the unusual stability of the $Cs_2WO_4$ at 1000° C. This high temperature stability of the polytungstate, prior to formation of the tantalate provides for the advantageous reaction of $Cs_2O$ with the $Ta_2O_5$ (and $Nb_2O_5$) thereby reducing the loss of cesium by volatilization.

The low loss of the cesium is confirmed by radioassaying the various materials involved in the described reactions. For example, the total activity is represented by a 0.667 mev. gamma-peak and is in direct proportion to the weight of the cesium present. This provides standard, activity-vs.-weight curves so that upon synthesis of the final products, the total activity in the 0.667 mev. gamma peak is determined. This determination corresponds with a determination of the cesium weight and a standard allowance is made for the self shielding of the various materials.

It has also been discovered that the mixing of small amounts of $B_2O_3$ (boric acid), from 1–5% by weight to the reaction mixtures provides a flux melting at 294° C. and by fusing the reactants in this flux, the loss of the cesium through high temperature decomposition of the formed-product is prevented. Illustrative of the benefits of this flux is the ignition of pellets such as $$Cs_2^{137}B_2O_{3(0.1)}Al_2O_3 2SiO_2$$

and $Cs^{137}W_xTa_{1-x}O_3(B_2O_3)$ in air for three consecutive 6-hour periods at 1370° C. In all these cases the total weight of the pellets remained constant and no loss of cesium-137 activity was detected. $CsW_xNb_{1-x}O_3$ is likewise stable.

Radioassaying also confirms the low solubility characteristics of the respective compounds. To this end pellets are pressed from the finely-ground powder of the compounds, and sintered at high temperature in air, the total cesium activity being compared before and after sintering. Each pellet is placed in plastic vials to which 5 ml. of the solvent e.g. cold water, hot water (65° C.), 1 N HCl and 2.7 N NaOH, respectively, are added and kept under these conditions for a minimum period of 22 hours. As shown in the following table no solubility was detected:

TABLE I.—SOLUBILITY CHARACTERISTICS OF THE SYNTHESIZED PRODUCTS

Compound _____ $CsW_xTa_{1-x}O_3$.
Test duration, hrs. _____ 24.
Solubility evaluation _____ Excellent.
Percent activity found in solution:
    Cold $H_2O$ _____ None.
    Hot $H_2O$ [1] _____ None.
    1.0 N HCl _____ None.
    2.7 N NaOH _____ None.

[1] Test run at 65° C.

On separate studies, the solubility of $CsW_xNb_{1-x}O_3$ was determined to be like that of $CsW_xTa_{1-x}O_3$. These compounds thus satisfy the major requirements for a safe fuel form.

The energy out-put of the fuel material is directly dependent on the cesium-137 power density since as the cesium fraction of the total weight of the material as well as the density of the sintered pellets increases, the cesium-137 power density increases thereby yielding a higher energy output per cubic centimeter. Finely crushed powders of the ingredients are therefore pressed into pellets at high pressure, from 22 to 100 t.s.i. as shown in the following table:

TABLE II
[Pellet density as a function of forming pressure (g./cc.)]

| Compound | Pressure, t.s.i. | | | | | | | |
|---|---|---|---|---|---|---|---|---|
|  | 10 | 22 | 31 | 41 | 46 | 51 | 61 | 100 |
| $CsW_xNb_{1-x}O_3$ (1) |  |  |  |  |  |  |  |  |
| $CsW_xNb_{1-x}O_3$ (2) |  |  |  |  |  |  |  | 3.92 |
| $CsW_xTa_{1-x}O_3$ (1) |  | 4.52 |  | 4.71 | 4.63 |  |  |  |
| $CsW_xTa_{1-x}O_3$ (2) |  | 4.53 | 4.43 | 4.84 | 4.90 |  |  | 4.84 |

[1] Green pellet density (g./cc.).
[2] Fired pellet density (g./cc.).

In an example of the method and composition of this invention a highly active feed solution of $Cs^{137}Cl$ obtained from reactor fuel storage facilities is converted to cesium polytungstate ($Cs^{137}_2WO_4$) without any loss of cesium during the synthesis by passing the solution of $Cs^{137}Cl$ through an ion exchange resin pretreated with concentrated $(NH_4)_2CO_3$ and washed free of ammonia, after the exchange between the chlorine and carbonate ions takes place, the effluent solution of $Cs^{137}_2CO_3$ is contentrated by evaporation.

A stoichiometric mixture of $Cs^{137}_2CO_3$ and $WO_3$ (+10% excess) powders are mixed and fired in platinum crucibles at 340° C. in a muffle furnace (although a stainless steel autoclave may also be used for this purpose) until reaction has taken place. The reaction mixture is dissolved in water, the insoluble residue of $WO_3$ kept for the next run, and the $Cs_2WO_4$ recovered by evaporation to dryness.

Stoichiometric mixtures of Cs-137 containing $Cs_2WO_4$ and $Ta_2O_5$ are mixed and heated with .1 $B_2O_3$ in platinum crucibles slowly up to 1400° C. and held for one hour at this temperature. The cooled products are washed with water and dried at 110° C.

The resultant material is finely ground and pressed into pellets at 1300° C. for one hour at 22 t.s.i. The hard stable pellets have a very low solubility rate in warm water, 1 N HCl and 2.7 N NaOH. Tracer pellets containing cesium-137 were kept in the aqueous solution for one week. No activity was detected in solution after this period.

In another example, stoichiometric mixtures of $Nb_2O_5$ and $Cs_2WO_4$ are heated with .1 $B_2O_3$ slowly up to 1450° C. and held there for four hours in a platinum crucible. The resultant material is finely ground and pressed into pellets at 22 t.s.i. for one hour at 800 C.

A summary of the physical and chemical properties is presented in the following table:

TABLE III

[Physical and chemical properties of the synthesized cesium compounds]

| Compound | Solubility characteristics | Sinterability hardness | Melting point, °C. | Material density, g./cc. | Pellet density, g./cc. | Percent Cs | Meas. Cs density, g./cc. |
|---|---|---|---|---|---|---|---|
| $CsW_xNb_{1-x}O_3$ | Excellent | Good | >900 | | 3.92 | 48.54 | 1.84 |
| $CsW_xTa_{1-x}O_3$ | do | Excellent | >1,470 | 7.0 | 4.9 | 36.74 | 1.80 |

This invention has the advantage of providing a low Cs loss method and product for radioisotope heated thermoelectric generators. Actual tests, for example, have shown the production of the product with cesium (and thus cesium-137) losses of less than 1%. Moreover, this compound produced has the advantage of no loss of cesium (and thus cesium-137) at temperatures below 900° C. for the niobate and 1400° C. for the tantalate. Additionally, this product has an increase in cesium density, as much as 33%, over cesium compounds used heretofore as well as low solubility and easy fabricability into fuel pellets for thermoelectric generators.

I claim:
1. The method of making a stable cesium compound, comprising combining $Ta_2O_5$ and $Cs_2WO_4$ at between 1000° C. and 1400° C. until a constant weight is obtained to form cesium tungsten tantalate.
2. A composition for a high temperature radioactive heat source for radioisotope heated thermoelectric generators, which consists essentially of stoichiometric mixtures of $Cs^{137}$ containing $Cs_2WO_4$ and a metal oxide selected from the group consisting of $Ta_2O_5$ and $Nb_2O_5$ mixed with 1-15% by weight $B_2O_3$ which acts as a flux that prevents the high temperature decomposition of the composition.
3. The method of making a stable cesium compound for use as a heat source in a radioisotope heated thermoelectric generator, comprising converting a highly active feed solution of $Cs^{137}Cl$ to $Cs^{137}_2WO_4$ by firing a stoichiometric mixture of $Cs^{137}_2Co_3$ and $WO_3$ at between 340° and 600° C., and combining the $Cs^{137}_2WO_4$ also with $Ta_2O_5$ at between 1000° C. and 1400° C. to form

4. The method of fusing $Cs_2WO_4$ with $Ta_2O_5$, comprising mixing said ingredients and heating said mixture to 1400° C. for two hours to form $CsW_xTa_{1-x}O_3$.
5. The method of making $CsW_xTa_{1-x}O_3$ comprising mixing stoichiometric amounts of $Ta_2O_5$ and $Cs_2WO_4$ with water, drying said mixture in a steam bath and fusing said ingredients with $B_2O_3$ at between 1000° C. and 1400° C. until a constant weight is obtained.
6. A composition for a high temperature radioactive heat source for radioisotope heated thermoelectric generators, comprising $Cs^{137}$ containing $CsW_xTa_{1-x}O_3$.
7. A composition for a high temperature radioactive heat source for radioactive heated thermoelectric generators, comprising $Cs^{137}$ containing $CsW_xNb_{1-x}O_3$.
8. The method of making a stable cesium compound, comprising fusing at between 1000° C. and 1400° C. a small amount of boric acid from 1–5% by weight with stoichiometric mixtures of cesium polytungstate and metal oxide compounds selected from the group consisting of $Ta_2O_5$ and $Nb_2O_5$.

References Cited

UNITED STATES PATENTS 3,112,992   12/1963   Bither, Jr. _____ 23—51
3,165,419   1/1965   Beyer _____ 23—51X LELAND A. SEBASTIAN, Primary Examiner U.S. Cl. X.R.

23—51; 136—202